July 6, 1965

L. BENTZMAN 3,193,135

ARTICLE DISPENSING MACHINE

Filed Sept. 28, 1962

INVENTOR.
Louis Bentzman
BY
Synnestvedt & Lechner
ATTORNEYS

July 6, 1965 L. BENTZMAN 3,193,135
ARTICLE DISPENSING MACHINE
Filed Sept. 28, 1962 7 Sheets-Sheet 2

INVENTOR.
Louis Bentzman
BY
Synnestvedt & Lechner
ATTORNEYS

July 6, 1965

L. BENTZMAN

3,193,135

ARTICLE DISPENSING MACHINE

Filed Sept. 28, 1962

INVENTOR.
Louis Bentzman
BY
Synnestvedt & Lechner
ATTORNEYS

3,193,135
Patented July 6, 1965

3,193,135
ARTICLE DISPENSING MACHINE
Louis Bentzman, Levittown, Pa., assignor to Rudd-Melikian, Inc., Hatboro, Pa., a corporation of Pennsylvania
Filed Sept. 28, 1962, Ser. No. 227,025
12 Claims. (Cl. 221—6)

This invention relates to article dispensing machines, and more particularly to dispensing machines of the type designed to vend one article at a time.

The vending or dispensing apparatus of this invention is particularly useful for vending articles such as cartons holding a plurality of bottles of soft drinks or the like. Soft drink cartons are illustrative of a class of articles which are difficult to handle by techniques common in the vending machine art. They are heavy, less than completely stable in shape, and do not lend themselves to the forming of stable stacks of any great height. In addition, because of their somewhat irregular shape, only certain surfaces of the carton form good sliding or pushing surfaces. Furthermore, because of some or all of the above characteristics, articles of this type can not safely be dropped for relatively great distances in accordance with certain common vending machine techniques.

Other articles of merchandise which have similar properties and which may easily be handled by the dispensing apparatus of this invention include paper milk cartons, cartons of cans, etc.

It is an object of this invention to provide an article dispensing machine for dispensing heavy or difficult-to-handle articles one at a time.

Another object of this invention is to provide an article dispensing machine in which the article storage compartment and the associated article moving apparatus are so arranged that a high efficiency of storage space utilization is obtained.

It is a further object of this invention to provide article dispensing apparatus in which a customer may see the article he purchases before depositing his money and removing the article from the machine.

Still another object of this invention is the provision of an individual article dispensing machine which can accommodate articles which can not readily be stacked or vended from stacks.

It is an object of this invention to provide a dispensing machine arranged for easy modification to handle cartons and the like of different dimensions and sizes.

It is an object of this invention to provide a dispensing machine which is so arranged that jamming conditions caused by fouling of one article on another are minimized.

A still further object of this invention is the provision of an article dispensing machine in which article shifting operations are performed following the dispensing of an article rather than during the dispensing thereof.

Yet another object of this invention is the provision of an article dispensing machine which may readily be loaded and serviced.

It is an object of this invention to provide a dispensing machine in which articles are moved by gravity in series to a position for dispensing one at a time.

The above objects and purposes together with other objects and purposes may more readily be understood by consideration of the detailed description which follows and the accompanying drawings in which.

General description

Figure 1:
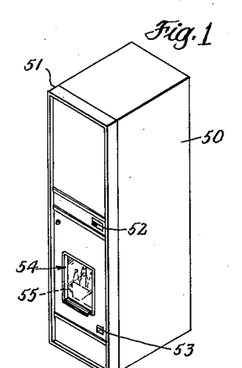
FIGURE 1 is an isometric small scale view of the cabinet of the dispensing machine.

From FIGURE 1 it can be seen that the article dispensing machine is provided with a cabinet 50 having a loading door 51 extending substantially across the face thereof. The machine is provided with a coin slot 52 and a coin return opening 53. In the loading door there is mounted an access door indicated generally at 54, through the glass window of which may be seen a carton 55 comprising the article to be dispensed.

Before proceeding with a detailed description of the various components, they will be outlined generally for purposes of orientation. For similar reasons, the general mode of operation will be sketched here very briefly also. For these purposes, general reference is made to FIGURES 2, 4 and 5.

Immediately behind the access door 54 is an article delivery station indicated generally as 56 in which is positioned the before-mentioned carton 55. In a typical operation the customer will insert his money, raise the access door 54, remove the carton 55, and allow the access door to close, thus leaving the delivery station in an empty condition.

Figure 4:
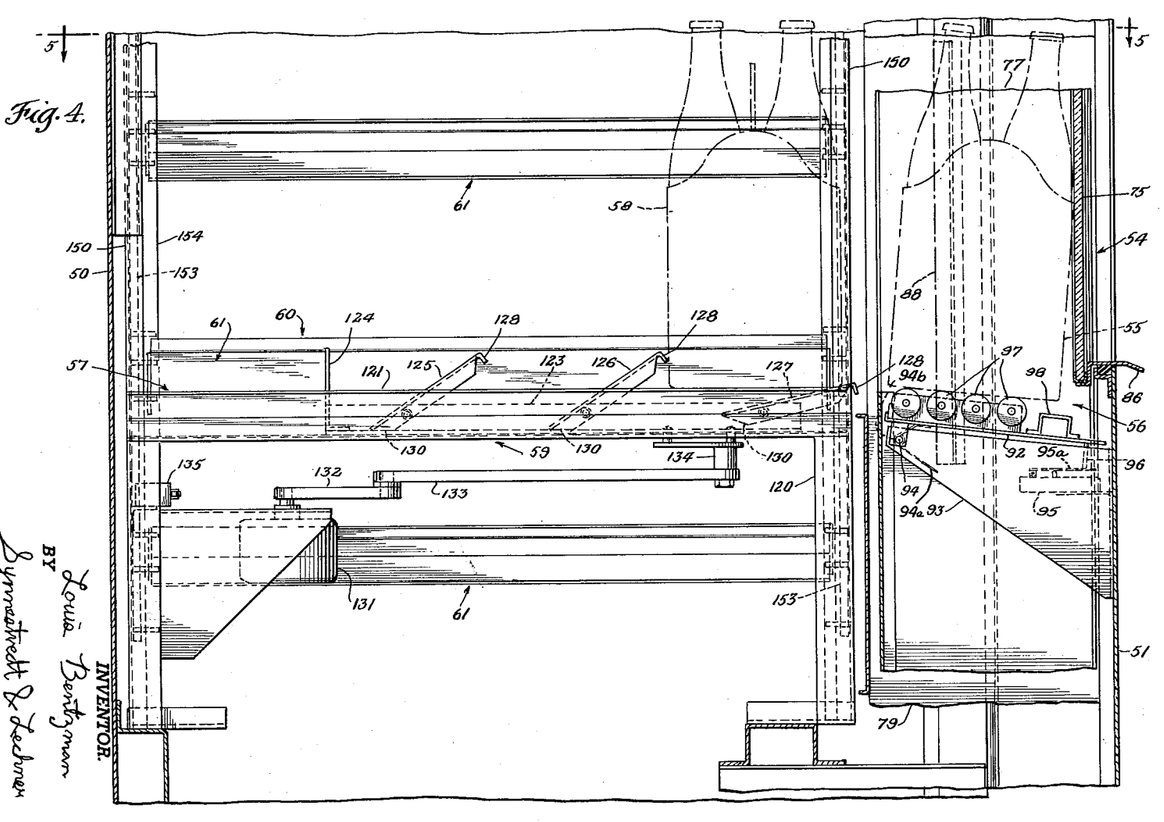
FIGURE 4 is a section view on the line 4—4 of FIGURE 2 with the loading door included.
Figure 5:
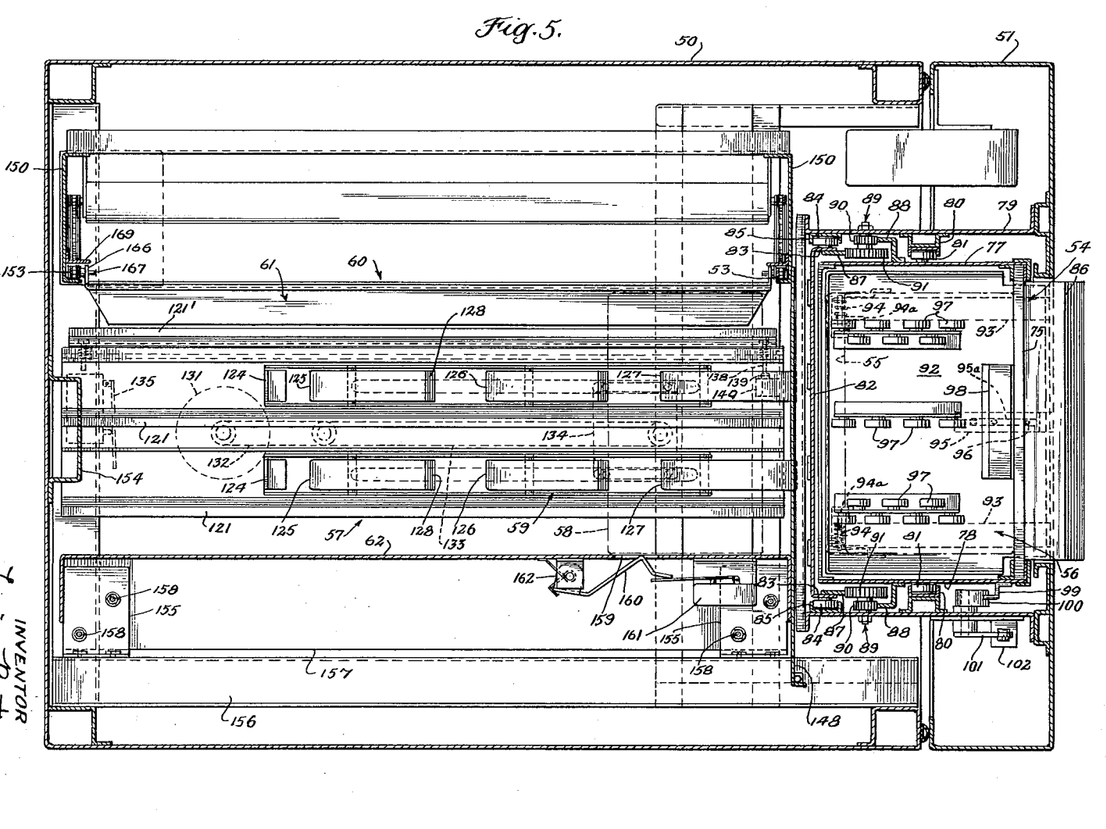
FIGURE 5 is a plan section on the line 5—5 of FIGURE 4.

In the body of the cabinet, behind the delivery station is an article supporting shelf designated generally as 57. In the embodiment shown in FIGURES 2, 4 and 5, this shelf when completely filled will hold four cartons. In FIGURES 4 and 5 one carton 58 is shown in position on the shelf 57. Associated with the shelf 57 is mechanism indicated generally as 59 for successively feeding, for example, by pushing, cartons to the delivery station 56.

After a customer has removed a carton such as 55 from the delivery station 56 and the door is closed, the feed mechanism 59 is actuated to push a carton such as 58 into the delivery station. By considering a machine with an article supporting shelf initially holding four cartons, it can be seen that the shelf will be empty after four purchases, and that in the portion of the machine thus far considered there will be only one carton, which will be located in the delivery station.

Figure 2:
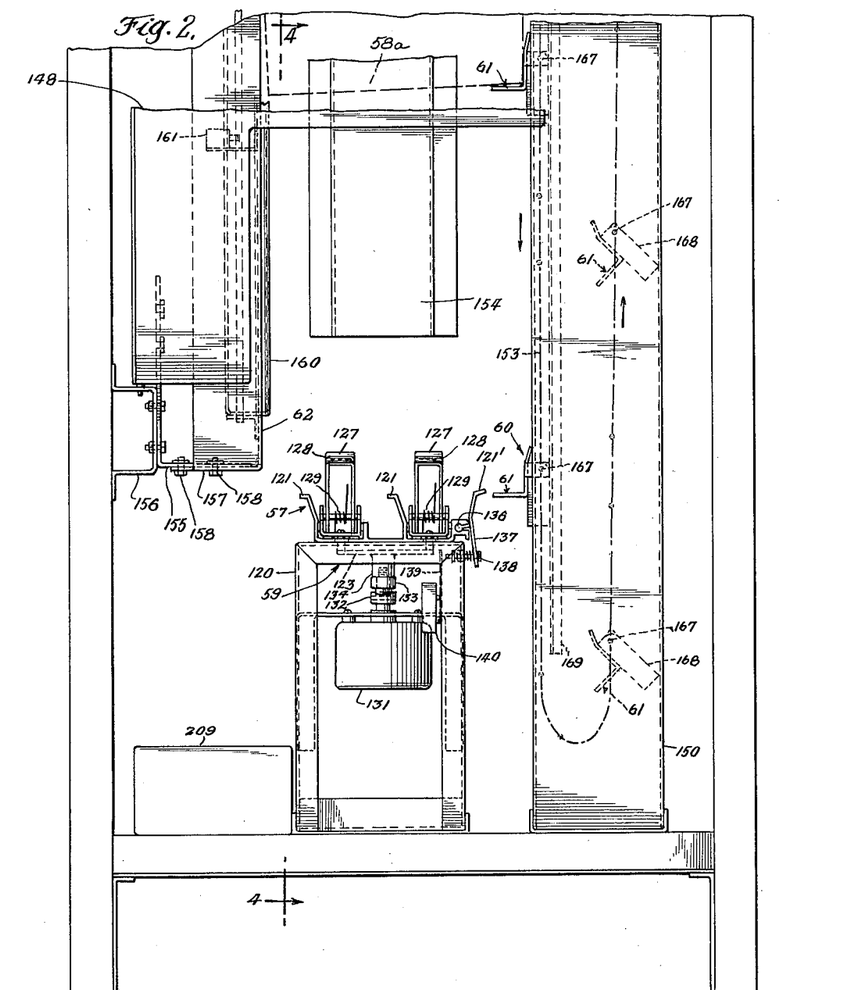
FIGURE 2 is an enlarged front elevational view of the lower portion of the cabinet with the loading door removed and with no cartons or articles in place.

As can most readily be seen in FIGURE 2, the dispensing machine is provided with an upright conveyor, indicated generally at 60, mounted to one side of the article supporting shelf 57. The conveyor 60 carries vertically spaced article support members 61. These support members are of a size such that they will pass downwardly past the article support shelf 57. The dispensing machine is also provided with an adjustable side wall 62 located opposite the conveyor 60. The article support members 61 cooperate with the wall 62 to support one or more cartons. The manner in which the cartons are supported appears most clearly in FIGURE 2 where it can be seen that a carton 58a is shown in dot and dash outline on the uppermost support member 61 in that figure. One side of the bottom of a carton rests on the support member 61, but this support member does not extend all the way across the bottom of the carton. As a consequence, the carton leans away from the support member 61 toward the wall 62 which is so placed with respect to the conveyor 60 that the carton leans against it instead of falling off the support member 61. Nevertheless, as indicated on FIGURE 2, the carton 58a is supported on one side by the ledge of narrow support member 61 and on the other side by the wall 62 which restrains the carton from tipping off member 61 by abutting the side wall of the carton which leans against wall 62. By this means cartons are supported on the various support members 61 in positions directly above the article support shelf 57 in a manner so they can be lowered by the conveyor to the support shelf.

Each of the support members 61 carries, when the machine is fully loaded, a number of cartons equal to the number the support shelf is designed to accommodate. Thus, in the embodiment shown in FIGURES 2, 4 and 5, each member 61 will hold four cartons similar to 58.

When, because of purchases being made, all of the cartons on the support shelf 57 have been advanced to the delivery station, and the last such carton has been removed from the station, and the door has been closed, the conveyor mechanism 60 is actuated to lower the next series of cartons, that is, those carried on the support member 61 located immediately above the shelf 57 onto said shelf. In this operation the cartons and support members located at higher positions in the machine are also lowered a corresponding distance. With a new series of cartons on the support shelf 57, the machine is in condition to once again replace cartons removed from the delivery station by customers.

From the foregoing it can be seen that the dispensing machine of the invention includes a delivery station within the cabinet and article storage means in the cabinet. The article storage means includes an article supporting shelf 57 adjacent the delivery station for supporting or storing a series of articles, and the article storage means further iincludes a support carrying an additional series of articles above the first series, the support 61 being mounted on a downwardly movable conveyor mechanism.

*Access door and delivery station*

Figure 6:
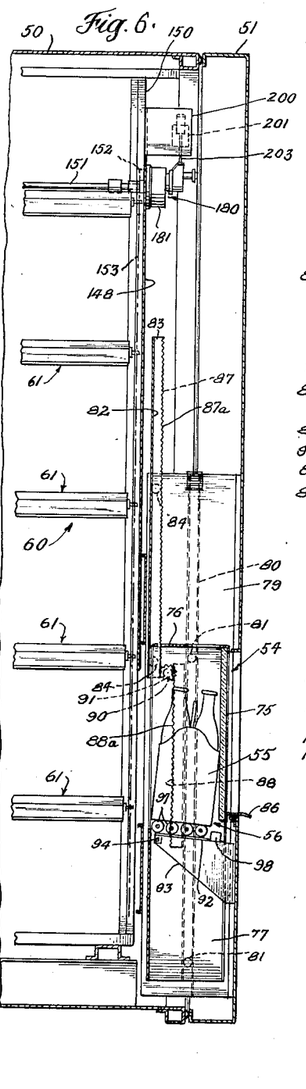
FIGURE 6 is a fragmentary side elevation in section from the bottom to the top of the cabinet and loading door on a reduced scale as compared with FIGURES 2 to 5.
Figure 7:
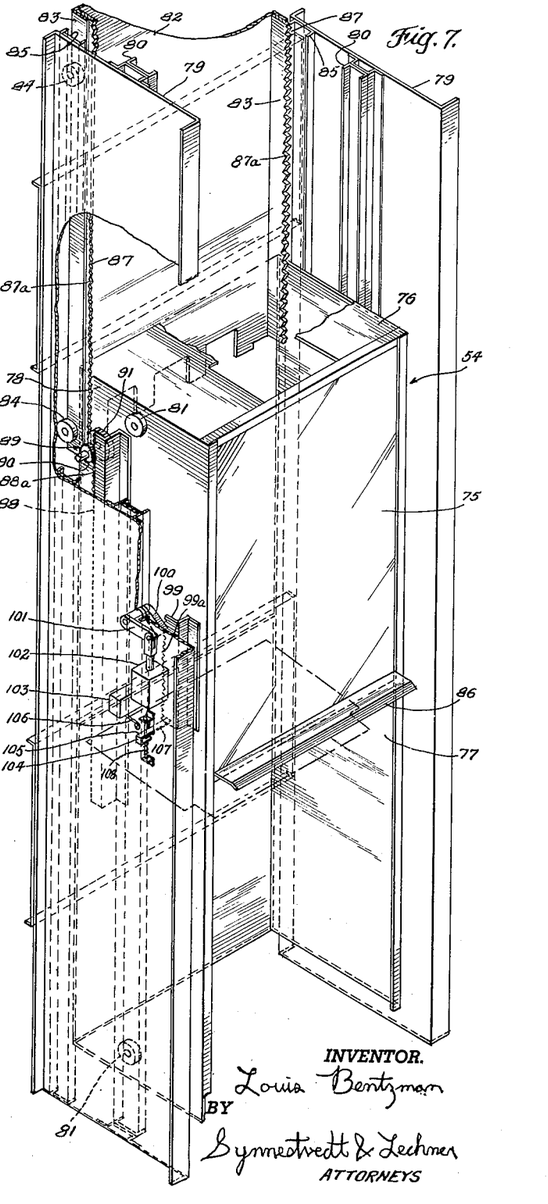
FIGURE 7 is an isometric view of the access door including an anti-theft barrier assembly, this view being approximately on the scale of FIGURES 2 to 5.

These components may best be understood by considering FIGURE 7 and, in addition, referring to FIGURES 4, 5, 6, 13 and 14. From FIGURE 6 it can be seen that the delivery station and the access door are located on the loading door 51 toward the bottom thereof. Turning now to FIGURE 7, it can be seen that the access door 54 is provided with a front face 75 which is desirably made of clear material such as glass. A handle 86 projects outwardly from near the bottom edge of the front face. The door is also provided with a top wall 76 and side walls 77 and 78. The front wall 75 is generally parallel to the front wall of the loading door 51, and similarly the side walls 77 and 78 are generally parallel to the side walls of the cabinet structure 50. The access door is mounted in an upright frame 79 which is provided on each side with vertical tracks 80 in which guide wheels 81 mounted on the sides of the access door run. Positioned behind the access door is an anti-theft barrier 82 which is preferably a metal plate disposed generally parallel to the front face 75 of the access door. The barrier is provided with forwardly turned flanges 83 carrying guide rollers 84 which run in vertical tracks 85 mounted on the upright frame 79. The forwardly turned flanges also carry a rack 87 provided with gear teeth 87a. Mounted on the sides 77 and 78 of the access door are racks 88 carrying teeth 88a which face toward the back of the machine. In the space between the barrier rack and the access door rack on each side there is mounted on the upright frame a gear set 89 having a small diameter gear 90 engaging the access door rack and preferably a larger diameter gear 91 engaging the barrier rack and mounted to rotate with the smaller gear 90. The size ratio of the gears 90 and 91 may be conveniently 2:1, in which case the anti-theft barrier 82 will move at about twice the speed of the access door 54.

Within the space partially enclosed by the face 75 and the side walls 77 and 78 of the access door is located the delivery station 56. The structure of this station appears in elevation in FIGURE 4 and in plan in FIGURE 5. It includes a floor 92 which is supported on the loading door 51 by means of the bracket arms 93. The floor 92 is mounted on the bracket 93 by the pivots 94 at the back edge of the floor, which pivots are spring loaded by means of springs 94a (appearing most clearly in FIGURE 4) to urge the front edge of the floor 92 upwardly. The pivots or pivot pins 94 pass through tabs 94b depending from the floor member 92 and through the brackets 93, thus providing a pivotal interconnection between the floor and the brackets. One such pivot mounting is provided at each of the rear corners of the floor member as can be seen from FIGURE 5. Positioned below the front edge of the floor is a switch 95, the arm 95a of which is actuated by a stud 96 located near the front edge of the floor 92. Thus the switch 95 is responsive to changes in the position of the floor 92.

The floor 92 is desirably provided with rollers 97 on its surface together with a rest bar 98 near the front edge thereof. As can be seen in FIGURE 4, the carton 55 in the delivery station tilts forward and leans against the face 75 of the access door. When the access door is open this carton will slide forward further on the rollers 97 and tip forward so that its lower right-hand corner, as seen in FIGURE 4, will come against the bar 98. In this way the carton 55 will be tilted partially through the access door opening at an angle somewhat greater than the angle of slope of the floor 92, in order to provide the customer with convenient access to the carrying handle of the carton 55.

On the outer side of the access door side wall 78 there is mounted a notched door lock bar 99. The notched edge 99a of this bar runs substantially vertically. The upright frame 79 carries a pawl 100 which can be seen most clearly in FIGURES 13 and 14. The pawl 100 is positioned to engage the notched edge of the door lock 99 and is operated through the lever 101 by the solenoid 102, which is also mounted on the upright frame 79. A switch 103 is positioned on the upright frame 79 adjacent the solenoid 102. Mounted below it is a reciprocating spring loaded switch operator 104 having a switch operating surface 105 positioned to engage the switch lever 106. The switch operator 104 is also provided with a surface 107 which protrudes into the line of travel of the door lock bar 99, which bar moves up and down with the access door on which it is mounted. The switch operator 104 is normally urged upward toward the switch 103 by the spring 108, and it is carried by the rod or bar 109.

While the operation of the electrical components of this apparatus will be described in another section hereinbelow, with special reference to the wiring diagram of FIGURE 19, a fragmentary description of the operation of the above-mentioned electrical components associated with the access door may be of help at this point. When the customer places his money in the coin slot the solenoid 102 is actuated to disengage the pawl 100 from the notched door lock bar 99, thus enabling the customer to lift the access door 54. The door lock bar moves upward with the access door to a point above the pawl 100. After the notched door lock bar 99 has been raised above the pawl 100 and the carton has been removed from the delivery station, the solenoid 102 is de-energized and the pawl 100 moves back into position to engage the door lock bar when it is again lowered. The customer may lower the door to within about 2″ of complete closure before the pawl engages any of the notches on the door lock bar.

As the door is raised by the customer, the switch operator 104, which is no longer held down by lock bar 99, and which is urged upwardly by its spring 108, actuates the switch 103 by moving upwardly against switch lever 106. As the access door 54 is again closed, the door lock bar 99, which is mounted on the door and therefore moves with it, pushes the switch operator 104 away from the switch 103, actuating it in the opposite direction, thus providing one of the signals utilized for initiation of the next step in the sequential operation of the machine. Cooperation of the lock bar 99, the switch operator 104, and switch 103 can best be understood by a consideration of FIGURES 13 and 14.

*Article feed mechanism*

Figure 10:
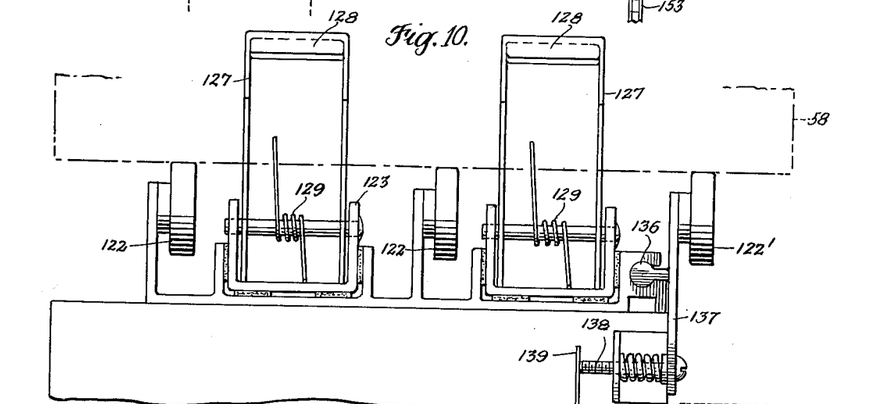
FIGURE 10 illustrates a modification of the article supporting shelf of FIGURE 2.

The components described in this section may best be understood by considering FIGURES 2, 4, 5 and 10. The article supporting shelf 57 is mounted on the frame 120. The carton bearing surface of the shelf in the embodiment shown in FIGURES 2, 4 and 5 comprises a series of rails 121 running longitudinally of the shelf. In the embodiment of FIGURE 10, however, the article supporting surface comprises a series of roller wheels 122. These rails and the surface they establish are positioned at a height level with or just slightly above the top of the rollers 97 in the delivery station 56. The feeding mechanism indicated generally at 59 comprises a carriage member 123 which is mounted for reciprocation on frame 120. The carriage member 123 is shorter than the shelf 57 and the frame 120 so that it may slide back and forth on the frame below the shelf. At the back end of the carriage 123 are a pair of upright pusher arms 124. These pusher arms project upwardly above the level of the rails 121. At spaced intervals along the carriage 123 are mounted pairs of spring loaded pusher arms 125, 126, and 127. Each of these pusher arms has a pushing surface 128. The pusher arms are spring loaded by means of springs 129 so that unless restrained they will assume a position with their pushing surfaces 128 located well above the rails 121. As can be seen on FIGURE 4 the distance between the pusher arm 124 and the pushing surface 128 of the pusher arms 125 is approximately the same as the width of a carton such as 58. Similarly, the distance between the pusher surfaces 128 of the pushers 125 and 126 is only a little greater than the width of a carton such as 58.

The movable pusher arms 125, 126, and 127 are desirably of channel section and are provided with beveled rear edges 130 for engagement with the carriage member when the pusher arms are in raised position.

As was pointed out above, the pushers will be raised by their loading springs 129 unless they are restrained. The carton 58 of FIGURE 4 is illustrated in a position to restrain the raising of the pusher arms 127 which are shown lying below the rails 57. In this view the pusher arms 126 are raised and the pushing surfaces 128 thereof are in contact with the carton 58, having at the stage of operation shown in FIGURE 4, just finished pushing that carton to the right in FIGURE 4. The pusher arms 125 are also raised in FIGURE 4, but as there is no carton adjacent them, they have no immediate function to perform in the condition of operation shown in that figure. Similarly, the upright pusher arms 124 are not in contact with a carton in the condition of operation shown in FIGURE 4.

A motor 131 is mounted on the frame 120 generally below the shelf 57. It is connected with the carriage member 123 by means of the crank 132, the connecting rod 133, and the carriage connection mounting 134. A switch 135 is mounted at the back of the frame 120 in a position so that it will be operated by the end of the crank 132 when said crank is at the back of its throw.

Once again, a fragmentary description of the operation of the above described components may be useful at this point, although a unified description will follow later.

FIGURES 4 and 5 show the article feed mechanism just described at a point approximately halfway through a typical cycle of operation. Therefore, there will be described various other stages in a cycle of operation preceding and following the point shown in FIGURE 4. At the beginning of the specific cycle shown in FIGURES 4 and 5 the motor crank 132 was at the left-hand limiting position, and was in contact with the switch 135. The carriage member 123 similarly was at the far left-hand end of its path of travel. The carton 55 which in FIGURES 4 and 5 is in the delivery station was on the shelf 57 in the same position which the carton 58 occupies in FIGURES 4 and 5. The carton 58 was located on the shelf 57 immediately to the left of the carton 55. Since the carriage 123 was in its left-hand position, the pusher arms 126 occupied the same relative position with respect to the carton 58 as is shown in FIGURE 4. For the same reason, the pushers 127 occupied about the same relative position with respect to the carton 58. The situation just described and which may be characterized as the "starting point" of the delivery mechanism operating cycle, exists just after a customer has removed a carton from the delivery station 56 and closed the door 54.

From this starting position, the motor 131 is turned on and begins to rotate. This moves the crank 132 away from the switch 135. As the motor and its crank continue to turn, the carriage 123 moves to the right in FIGURES 4 and 5. The pusher arms 126 push against the carton 58 causing it to slide along the rails of the shelf. The carton 55, positioned next to the carton 58 and on its right, is pushed by the carton 58 to the right also. As the carriage 123 approaches the right-hand terminus of its travel, the carton 55 is pushed off the end of the shelf 57 into the delivery station. The motor 131 continues to turn and thus moves the carriage 123 to the right until the position illustrated in FIGURE 4 is reached.

In this position, the motor 131 has turned for ½ of a revolution, and has moved the carriage 123 to its right-hand terminus. The carton 55 has been moved into the delivery station, and the carton 58 has been pushed by the pusher arms 126 to the right-hand end of the shelf 57.

From this point in the cycle of operation, the motor 131 continues to turn in the same direction. In doing so, it draws the carriage 123 toward the left. Thus, the pusher arms 126 move out of contact with the carton 58 and the pusher arms 127 are drawn to the left under the carton 58 sitting on the rails of the shelf 57. After the carriage has been moved to the left some distance by the motor, the pusher arms 127 will clear the carton 58 and pop up behind it in the same relative position with respect to the carton 58 as the pusher arms 126 are shown as occupying FIGURES 4 and 5. That is to say, the pusher arms 127 pop up to assume a pushing position just to the left of the carton 58. This occurs near the end of a typical operating cycle.

The motor continues to operate until it has turned one full revolution to bring the crank 132 into contact with the switch 135 which turns the motor off, thus ending the cycle. At the end of the cycle the equipment is in a position much the same as it occupied in the starting position described above, and is in fact in its starting position for the next cycle of operation. The differences to be noted between the starting position and the end of a given cycle are that the shelf 57 holds one carton less at the end than it did at the beginning and that a different set of pusher arms is in pushing position, namely, the next set to the right in FIGURES 4 and 5.

The cycle of operation just described is typical of the operation carried out after each removal of a carton from the delivery station. However, there are differences in each succeeding cycle of operation resulting from differences in the number of cartons on the self 57. The motor in each cycle of operation turns one revolution as has been described above, and the carriage 123 moves from its left-hand most position to its right-hand most position and returns to its left-hand most position as described above. However, if the shelf 57 holds four cartons at the beginning of a cycle of operation, the pusher arms 124 will be in pushing position to the left of the left-hand most carton. Similarly, in a cycle beginning with three cartons on the shelf, the pusher arms 125 will be in the operating position.

In FIGURE 2 the rail 121' which is located at the right-hand side of the shelf 57 is mounted on a pivot 136 for a short pivoting motion. An extension 137 of the rail 121' is connected to a spring loaded switch operator 138 which pushes on the switch lever 139 of switch 140. Thus the switch 140 will respond to the presence and absence of cartons on the shelf 57. In FIGURE 10 it can be seen that the right-hand set of rollers 122' are similarly mounted to actuate the switch 140 (which switch is not shown in FIGURE 10).

*Article conveyor mechanism*

It will be remembered from the general description above that after a certain number of cycles of operation, the article feed mechanism associated with the generally horizontal shelf 57 will be empty of cartons. Article conveyor mechanism is provided for reloading the article feed mechanism with a series of cartons when this condition occurs.

Figures 11, 12:
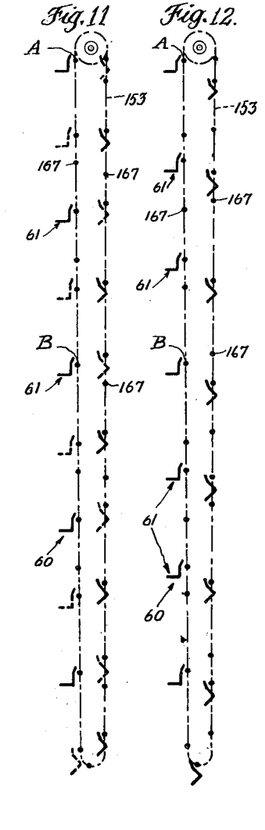
FIGURES 11 and 12 are diagrammatic views of the article conveyor and the article supports mounted thereon.

The principal component of the article conveyor mechanism is the conveyor designated generally as 60 in FIGURE 2. From FIGURES 2 and 6 it can be seen that the conveyor includes a supporting frame 150 near the top of which is mounted a shaft 151. At either end of the shaft there is a sprocket wheel 152 provided with sprocket mounting means such as the hub 149 which appears most clearly in FIGURES 15 through 18. The conveyor mechanism further includes two endless chains 153, one of which is passed over each sprocket. It is unnecessary to provide a set of sprocket wheels at the bottom of the conveyor and as can be seen in FIGURES 2, 11 and 12, the conveyor chains merely hang in a loop at the bottom. There is thus provided a conveyor which is preferably arranged generally upright at one side of the vending machine and extending along that side from a point near the front of the machine toward the back. FIGURE 2 shows that the conveyor is positioned with respect to the article feed mechanism to one side of it and extending upwardly away from it.

Another portion of the article conveyor mechanism is the adjustable side wall 62 mentioned briefly before. This wall is generally upright and is positioned along the opposite side of the machine from the conveyor 60. It extends from a point near the front of the machine toward the back. The adjustable side wall 62 and the conveyor 60 together define a storage compartment approximately one carton wide located above the article feed mechanism. This appears most clearly in FIGURE 2. The back of this storage compartment is formed by the bumper member 154 which serves to strengthen and protect the back wall of the cabinet in the region of the storage compartment, and insures proper positioning of the rearmost carton. The front of the storage compartment may conveniently be defined by the interior door 148 which is mounted behind the loading door.

Figure 3:
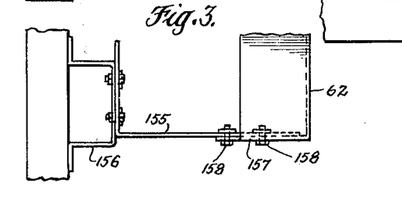
FIGURE 3 is a detailed view partly broken away showing the side wall adjusting bracket appearing in FIGURE 2.

As pointed out in the general description, the conveyor chains 153 carry a series of article support members 61, and cartons are positioned in the storage compartment on the article support members with the other side of the carton leaning against the adjustable side wall 62. The cartons are preferably so placed on the support member so that their long side is generally parallel with the front of the machine; in any event, the cartons are placed so that all of them have the same side parallel with the front of the machine. Since various types of cartons which may desirably be vended from the machine vary in length, because they hold different sizes or numbers of cans or bottles, etc., the side wall 62 is provided with adjustable mounting means so it may be moved toward and away from the conveyor 60 to vary the width of the storage compartment. In this way the apparatus may be used on some occasions to accommodate cartons of a given length, and be readily adjusted to accommodate cartons of a different length on other occasions. Ordinarily, cartons of different lengths will not be mixed in a given load in the machine. As appears in FIGURES 2, 3 and 5, there are adjustable brackets at the front and back of the side wall at the bottom thereof. A similar set of adjustable brackets is provided at the top of the side wall 62. These brackets consist generally of an L-shaped bracket 155, the verticle leg of which is attached to the frame member 156. The horizontal leg is in sliding engagement with the inturned flange 157 of the side wall 62. This flange is generally horizontal and is provided with slots oriented generally at right angles to the face of the wall 62. The horizontal leg of the bracket 155 is provided with holes through which bolts are passed. These bolts are also passed through the before-mentioned slots and by this means the wall 62 may be moved toward or away from the conveyor 60 and may be secured in the desired position by tightening the nuts associated with the bolts 158. In FIGURE 2 the wall 62 is positioned relatively far away from the conveyor 60. In FIGURE 3 the wall is shown extended a relatively large distance toward the conveyor 60, to provide a narrower storage compartment.

A vertical slot 159 is provided in the wall 62 near the bottom and toward the front thereof. A spring loaded sensing element 160 protrudes through this slot into the region normally occupied by a carton at the right-hand end of the shelf 57 and into the region normally occupied by a carton on a support 61 directly above the right-hand end of the shelf 57. As can be seen in FIGURE 5, when a carton such as 58 is in position on shelf 57 or a carton is positioned directly above it, either one will force the sensing element back through the slot to a position flush with the surface of the wall 62. The movement of the sensing element actuates the switch 161 which is mounted on the inside face of the wall 62. When no carton is at the right-hand end of the shelf 57, and no carton is on a support shelf 61 in a position directly above the right-hand end of the shelf 57, the sensing element 160 protrudes through the slot and thereby actuates the switch 161. This in turn in cooperation with the switch 95 in the delivery station, and switch 140 on the article support shelf 57, actuates a "sold out" indicator. The spring loaded mounting 162 of the sensing element 160 is attached to the inner face of the wall 62.

A series of article support members or devices 61 are mounted on the conveyor chains 153. The support members are positioned generally horizontally and extend between the front and back chains of the conveyor. As indicated by the arrows on FIGURE 2, the conveyor has a downward run and an upward run. The article support members 61 when they are positioned on the downward run of the conveyor are oriented in an operative article supporting position. In FIGURE 2 the support members 61 which are shown in full lines are in such a position. On the other hand, the article support members which at any given time are positioned on the upward run of the conveyor are in an idling or non-article supporting position. The support members shown in FIGURE 2 in dotted lines are in an idling position. The difference between the supporting position and the idling position always appears diagrammatically in FIGURES 11 and 12, on which figures the left-hand support members are operative and the right-hand members are idling.

FIGURES 15 through 18 illustrate the construction of the article support member. Each support member has an article carrying ledge 163 which, when the support member is in operative position, is positioned generally horizontally as shown in the dotted line portion of FIGURE 17. Preferably the support member also includes a back wall 164 which is generally at a right angle to the ledge 163. For reasons to be explained later, the top of the back wall 164 terminates in a trip member 165. The support member further includes at each end a pivotal mounting bracket 166 which appears most clearly in FIGURE 18. These brackets are provided with holes for pivotally engaging the article support member mounting means 167 which may conveniently be link pins of the chains 153 which are of greater length than the width of the chain and extend inwardly. The article supporting means is also provided at each end with a tab 168. This tab is so positioned that when the article support means is in operative position on a downward run of the conveyor, it slidingly engages an abutment which is mounted on the supporting frame adjacent and behind the downward run of each chain. The abutment extends from a point below and inboard of the sprockets 152 downwardly to a point above the bottom of the downward run. The lower portion of the abutment 169 may be seen in FIGURE 2, while the upper portion appears in FIGURES 15 through 18.

When a given article support member 61 moving along the downward run of the conveyor reaches a point near the bottom of the downward run, the tabs 168 will move out of sliding engagement with the abutment 169 and the support member will assume its idling position which it occupies throughout the upward run of the conveyor. This operation may be understood by considering FIGURE 2.

Figure 15:
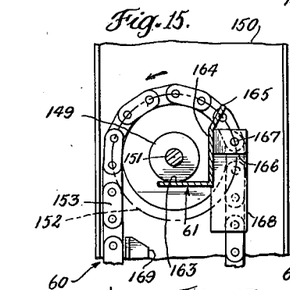
FIGURES 15, 16 and 17 are detailed views of the upper end of the article conveyor showing various positions of the article support carried thereon.
Figure 16:
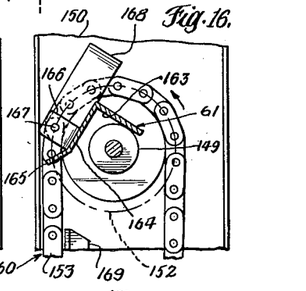
Figure 17:
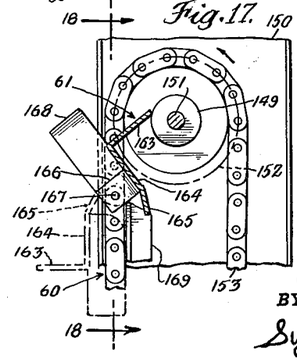
Figure 18:
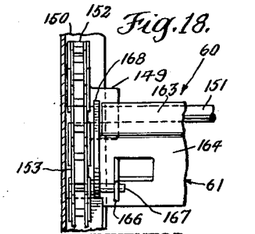
FIGURE 18 is a section on the line 18—18 of FIGURE 17.

When an idling support member 61 moves around the sprockets at the top of the conveyor from the upward run to the downward run, it must be converted from its idling position to its operative position. This conversion operation is illustrated in FIGURES 15 through 17 which show sequentially three steps in the operation. Arrows on these figures indicate the direction of movement of the chains 153. In FIGURE 15 an idling support member 61 is approaching the top of the upward run. As it does so the article carrying ledge 163 engages the sprocket mounting means 149. In FIGURE 16, which shows a later point in the conversion operation, the sprocket wheel 152 has rotated somewhat, moving the support member 61 around it and into a generally upside-down position. The article carrying ledge 163 remains in contact with the sprocket mounting means 149. In FIGURE 17, the sprocket wheel 152 is turned even further and in fact the portion of the chain carrying the pivot mounting means 167 is no longer in engagement with the sprocket wheel 152. The article carrying ledge 163, however, remains in contact with the sprocket mounting means. The trip member 165 is shown as it comes into engagement with the abutment 169. Slight further downward movement of the chains will enable the engagement between the trip member 165 and the abutment 169 to apply an overturning moment to the article support member as a whole, thus flipping it over in a counterclockwise direction in FIGURE 17 into its operative position as indicated by the support member shown in dotted lines in that figure. The overturning motion just described takes place about the pivot mounting means 167.

It was pointed out above that cartons vary in length depending on the size and number of bottles or cans contained in them, and an explanation was given of the adjustability of the side wall of the storage compartment which enables the machine to accommodate, at different times, cartons of varying length. Cartons of the same general type also vary in height, again depending on the size of the bottles or cans contained in the cartons. The conveyor mechanism of this invention is so arranged as to accommodate cartons of different heights and may be rearranged to provide high storage space utilization, that is, efficient carton storage density for cartons of varying sizes.

A problem involved in storing on the conveyor cartons of different sizes with an efficient utilization of storage space may be appreciated by considering FIGURE 12. On the downward run of the conveyor there are a series of article support members 61 which are substantially uniformly vertically spaced. Assume that the distance between the support members is 8″. With this arrangement the tallest carton which can be stored would be approximately 8″. A carton which is quite short may also be stored, but the portion of the 8″ spacing between the top of such a short carton and the next higher support member is in effect wasted storage space. The efficiency of the storage space utilization increases as the height of the carton approaches the distance between the supporting means, that is, 8″ in the case under consideration.

It has been found that the range of heights of soft drink cartons varies so much from one type to another that no completely satisfactory compromise single spacing of article support members on the conveyor will give maximum storage space utilization efficiency. In fact, for soft drink cartons it has been found that they ordinarily range from just under 6″ in height to a little under 12″ in height. Thus the 8″ spacing used in the example above, while it would be satisfactory for cartons approximately 8″ high, would be unable to handle 12″ cartons and would result in a vertical space wastage of 2″ out of every 8″, or 25%, for cartons about 6″ high.

According to the invention, certain link pins 167 at selected spaced intervals along the length of the chain 153 are of greater length than others, thus forming the support means for the article supports 61. The selection just described is based on the desired vertical spaces to be provided between article supports under various conditions. If it is desired to provide three such spacings, the total length of the chain must be a common multiple of the three spacings. For example, if it is desired to have carton spacings of 6″, 8″ and 12″, a chain length of 120″ will be satisfactory. It is useful to consider the lowest common multiple of the three carton spacings as a unit length because this is the smallest distance which will accommodate an integral number of any one of the carton spacings. In FIGURES 11 and 12 the distance between the two mounting means marked "A" and "B" is 24″, i.e., the lowest common multiple for carton spaces of 6″, 8″ or 12″. Within this lowest common multiple, mounting pins are located at distances of 6″, 8″, 12″, 16″, 18″ and 24″ from the point "A." The sequence of spacings between adjacent mounting pins follows a regular pattern which in the case of an arrangement for carton spacings of 6″, 8″, and 12″ is 6, 2, 4, 4, 2 and 6, within the lowest common multiple starting with "A" and ending at "B." This pattern repeats for each successive lowest common multiple unit around the conveyor chain. For other carton spacings with other lowest common multiple units, other repeating patterns of spacings within the common multiple will occur.

In order to convert the conveyor from one having a carton spacing of a given distance to one having a different spacing, one may remove all of the article supports 61 except one, for example one at point "A" in FIGURES 11 and 12, and then replace certain of the article supports at the desired spacing. In FIGURE 12 the article supports are shown mounted at 8″ intervals. In FIGURE 11 in which the mounting pins are spaced at the same intervals as in FIGURE 12, if both the full line and dotted line article supports are considered, there is a carton spacing 6″. If only the full line article supports are considered, and the dotted line ones are ignored, there is a carton spacing of 12″. Thus it can be seen that carton spacings of 6″, 8″ and 12″ may be obtained from the conveyor chains arranged with mounting pins as indicated in FIGURES 11 and 12. It has been found that with this arrangement a high efficiency of storage space utilization is possible for the various sizes of cartons commonly encountered in the soft drink field.

The conveyor moves downwardly to deposit a series of cartons carried on its lowest article support member onto the shelf 57 of the article feed mechanism. This movement is under the influence of gravity, that is to say, the weight of the cartons on the conveyor causes the conveyor to move downwardly at appropriate times. According to the invention, there is provided a control mechanism to start and stop the conveyor and braking mechanism to regulate the speed of descent of the conveyor. As can be seen in FIGURE 6, the governor and control unit indicated generally at 180 is positioned near the top of the machine on the supporting frame 150 adjacent the end of the conveyor shaft 151. The governor and its associated parts appear in more detail in FIGURES 8 and 9.

Figures 8, 9:
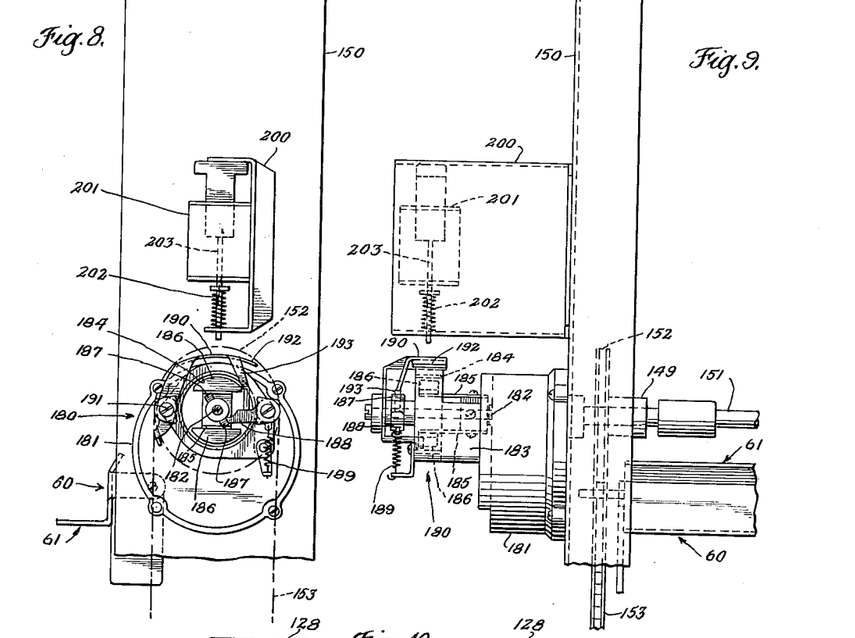
FIGURE 8 is a further enlarged elevational view of an article conveyor governor device.
FIGURE 9 is a side view of FIGURE 8.

A gear unit 181 is attached to the supporting frame 150 at a point so that the shaft 151 serves as the input drive to the gear unit. The output from the gear unit appears at the governor shaft 182. The gears within the unit are so selected that the output or governor shaft turns at many times the rate of the input or conveyor shaft. It has been found that a gear ratio of 70:1 is very satisfactory for use in a machine handling soft drink cartons. Cantilevered outwardly from the gear unit 181 is a cylinder 183 which terminates in a brake drum 184. The brake drum is concentric with the governor shaft 182. A pair of leaf springs 185 is attached at their ends to the governor shaft 182 near the point where the governor shaft enters the gear unit 181. Brake shoes 186 are mounted on the free ends of the two leaf springs. The brake shoes have curved surfaces conforming to the inside surface of the brake drum 184, and, as appears in FIGURE 9, are positioned within the brake drum.

The governor shaft 182 extends outwardly past the brake drum 184. On the outward extension of the shaft are mounted a pair of dogs 187. FIGURE 8 shows that there is a pawl 188 mounted on the short cylinder 183 in a position to pivot into and out of the path of movement of the dogs 187. The pawl is spring loaded by the spring 189 which normally urges it into the path of the dogs. A trigger 190 is pivotally attached at 191 to the short supporting cylinder 183. The trigger proper consists of a curved portion 192 which arcs over the brake drum 184. Extending downwardly from the curved portion 192 is a trigger pin 193 which rests on the pawl 188. When the curved portion of the trigger is pushed downwardly toward the brake drum, it works through the trigger pin and the pawl against the pawl spring 189.

A bracket 200 is cantilevered outwardly from the support member 150 above the gear unit and the governor. This bracket carries a solenoid 201 which is spring loaded by a spring 202 which urges the plunger 203 of the solenoid normally away from the trigger. FIGURE 9 shows that the plunger 203 is positioned directly above the curved surface 192 of the trigger.

When the article feed mechanism in the lower part of the machine is empty, this fact is sensed by the switch 140. When the delivery station is empty, switch 95 senses this fact. The fact that the access door 75 is closed is sensed by switch 103. Finally, switch 161 senses the fact that at least one carton is located on a support member 61 directly above the right-hand end of the shelf 57. These switches, when they reflect the above state of facts, cooperate to provide a signal which actuates the solenoid 201 to force its plunger 203 downwardly against the trigger 190. When this occurs, the trigger pin 193 pushes the pawl 188 out of the path of the dogs 187 on the governor shaft. The governor shaft is then free to rotate as is the shaft 151 of the conveyor. The weight of the various series of cartons on the support members 61 of the conveyor urges the conveyor downward, thus rotating the shaft 151. The governor shaft 182 is turned thereby at a relatively high velocity and the brake shoes 186, which rotate with the shaft, are urged outwardly into contact with the brake drum 184. Friction developed between the brake shoes and the brake drum tends to slow the speed of rotation of the shaft. If the rotational speed of the shaft drops below the desired level, the springs on which the brake shoes are mounted will tend to pull the shoes away from the brake drum, thus reducing the friction and allowing the shaft to increase its speed. Similarly, if the shaft tends to turn faster than is desirable, the brake shoes are urged into tighter contact with the brake drum, increasing the friction and tending to reduce the shaft speed to a desirable level. Thus the governor establishes and maintains a substantially uniform rate of rotation of the governor shaft, and through the gear unit 181 the rate of rotation of the conveyor shaft 151. By this means a uniform rate of descent of the cartons on the conveyor is established. Although this rate may vary somewhat depending upon how heavily the conveyor is loaded with cartons, the governor, in the manner just described, establishes a satisfactory rate of descent regardless of the load.

As the conveyor moves downwardly, the series of cartons on the lowest article support member will ultimately be deposited on the shelf 57 of the article feed mechanism. When this occurs, the switch 140 is operated, as hereinbefore described, and the operation of this switch de-energizes the solenoid 201. The plunger of the solenoid is then urged upwardly by its spring 202, and the pawl 188 is urged back into the path of the dogs 187 mounted on the governor shaft. One of the dogs will come into contact with the pawl, thus stopping the governor shaft and the conveyor. The trigger is raised by this operation into a position to be again depressed when it becomes necessary once more to operate the conveyor.

*Electrical components*

Figure 19:
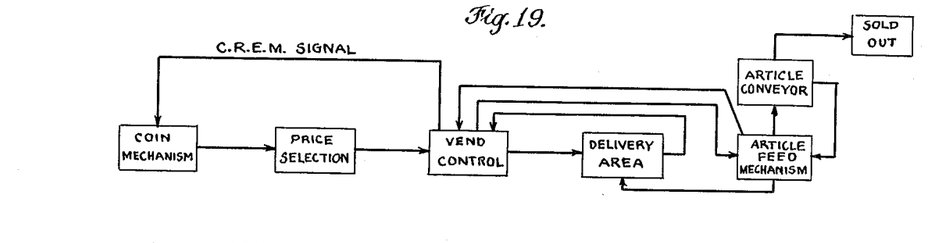
FIGURE 19 is a block diagram illustrating the information flow through the various electrical components according to the invention.
Figure 20:
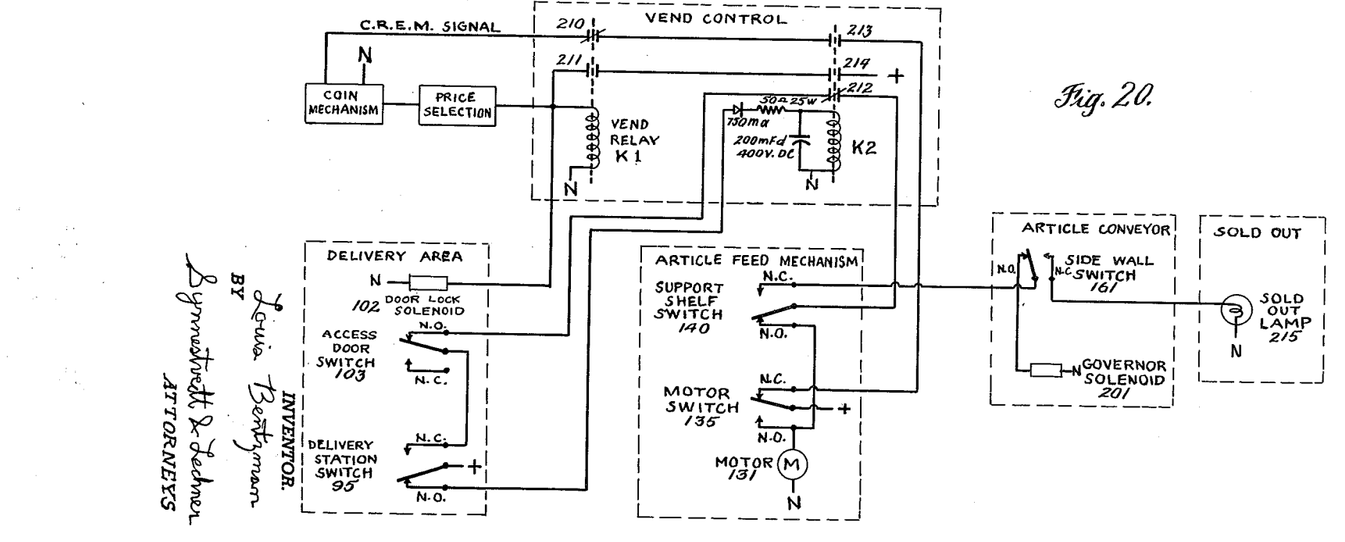
FIGURE 20 is a simplified schematic wiring diagram showing the electrical relationship of the more important components with respect to each other.

By means of the block diagram of FIGURE 19, and the schematic wiring diagram of FIGURE 20, together with the following description, an understanding of the operation of the electrical apparatus of this invention may be gained.

Considering first the block diagram of FIGURE 19, it can be seen that all but one of the blocks in that diagram represent a set of control equipment more or less closely associated with one physical aspect of the vending apparatus. For example, the "delivery area" block in the diagram represents control equipment which senses the condition of, and partially controls, the operation of the delivery area which, as will be recalled, comprises generally the access door, the delivery station, and the antitheft barrier. The block marked "vend control" represents a set of equipment which is more general in function in that it controls and directs operations performed by equipment represented by other blocks on the diagram. The vend control equipment, since it is not directly associated with any given portion of the apparatus, may be located at any convenient point in the machine, for example in the box 209 shown in FIGURE 2.

Consider a machine which is in the ready-to-vend condition, with a carton in the delivery station 56 and cartons located on the support shelf 57. Cartons may or may not be present on the conveyor 60 in the storage compartment. This is the most typical condition of the machine since it will exist more often during the vending of an inventory of cartons contained within the machine than any other ready-to-vend condition. With reference to FIGURE 19, the sequence of operation is as follows. The coin return electromagnet signal (abbreviated C.R.E.M. on FIGURES 19 and 20) from the vend control to the coin mechanism control places the coin mechanism in operative condition. The customer puts his money into the coin mechanism and it, in conjunction with the price selection mechanism (which counts the money as it is inserted into the machine and determines when an adequate amount has been deposited) delivers a signal to the vend control equipment. The C.R.E.M. signal from the vend control is then interrupted to render the coin mechanism inoperative, during the remainder of an operating cycle. A signal from the vend control equipment is passed to the delivery area where the access door 54 is unlocked. The removal of a carton from the delivery area sends a signal to the vend control which in turn passes a signal to the article feed mechanism. This signal initiates operation of the article feed mechanism and a carton is passed from said mechanism to the delivery area. This is functionally equivalent to the passage of a signal from the article feed mechanism to the delivery area since electrical equipment in the delivery area senses the presence of the newly received carton and passes a signal back to the vend control. An internal signal in the feed mechanism turns it off at the appropriate time, and sends a signal to the vend control. When the vend control receives both the signal from the delivery area, and the signal from the feed mechanism, it reestablishes the C.R.E.M. signal which renders the coin mechanism operative to receive money once again.

Another common ready-to-vend condition which occurs several times during the sale of an inventory contained in the machine is as follows. A carton is located in the delivery area 56, the shelf 57 in the article feed mechanism is empty, and cartons are located on the conveyor 60 in the storage compartment above the shelf 57. When this condition occurs, the flow of signals from one block to another will be the same as outlined above up to the point where the vend control sends a signal to the article feed mechanism. Instead of turning the article feed mechanism on, which would be futile since no cartons are positioned therein, the signal is passed on to the article conveyor to initiate its operation. A series of cartons from the article conveyor are thereby lowered onto the shelf 57 of the article feed mechanism. This is functionally equivalent to the passage of a signal from the article conveyor to the feed mechanism and a signal is fed back to the article conveyor to turn it off. The presence of articles in the feed mechanism generates an internal signal which enables said mechanism to begin its operation to pass a carton to the delivery area. As in the operation outlined earlier, such passage is in effect the passage of a signal to the delivery area which again signals the vend control. From the vend control the C.R.E.M. signal is reestablished, after the article feed mechanism turns off, and the coin mechanism can again receive money.

One other ready-to-vend condition will occur once during the dispensing of a given inventory from the machine. In this condition, a carton is located in the delivery area 56, but the shelf 57 in the article feed mechanism and the conveyor 60 in the storage compartment are both empty. Under this condition the flow of information will be similar to that first outlined above up to the point where a signal is delivered to the article feed mechanism. Since the feed mechanism is empty the signal will be passed through it directly to the article conveyor. Since the article conveyor is empty and further operation thereof would be futile, the signal is passed through it directly to the sold-out mechanism, the principal component of which is a sold-out lamp (shown in FIGURE 20). This signal lights the lamp and the machine remains in this condition until it is serviced.

The above description with respect to the block diagram of FIGURE 19 is designed to serve as a general guide in detailed consideration of the schematic diagram of FIGURE 20 which follows.

In the simplified schematic diagram of FIGURE 20, the coin mechanism and the price selection mechanism are indicated by blocks inasmuch as they may comprise well known or standard type equipment which need not be considered in detail herein. It should also be noted that dotted outlines enclosing certain of the other electrical components represent the blocks discussed earlier in connection with FIGURE 19, and are given titles corresponding to those used in that figure.

For the sake of simplicity, much of the power source wiring has been eliminated on FIGURE 20 and replaced by the conventional symbols "N" and "+" to indicate sources of voltage. For the same reason, certain accessory equipment such as display lights for the face of the machine, etc., is omitted.

The wiring diagram of FIGURE 20 is constructed to reflect the condition of the electrical components when the machine is in a ready-to-vend condition with a carton located in the delivery station, cartons positioned on the shelf 57 of the article feed mechanism, and cartons on the conveyor 60 in the storage compartment.

The vend control equipment includes two relays marked "K1" and "K2" on FIGURE 20. Relay K1 operates a contact 210 which is normally closed when the relay is de-energized. It also operates the contact 211 which is normally open when K1 is de-energized. The relay K2 operates the normally closed contact 212, the normally open contact 213, and the normally open contact 214. Associated with the relay K2 is a time delay device whose function is to allow K2 to de-energize a selected time after voltage is removed from one side thereof. The time delay device consists generally of a 750 milliamperes diode in series with a 50 ohm, 25 watt resistor and in series with the coil of K2 and a 200 microfarad, 400 volt D.C. capacitor placed across the coil of K2. This circuit causes about a two second delay in the de-energization of K2.

Figure 13:
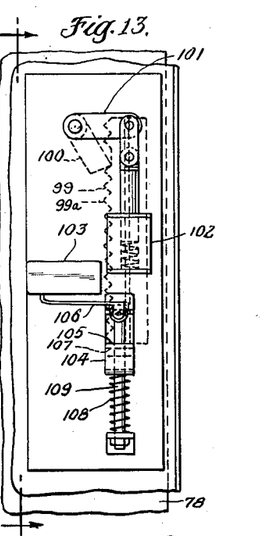
FIGURE 13 is a detailed view of the access door lock device.
Figure 14:
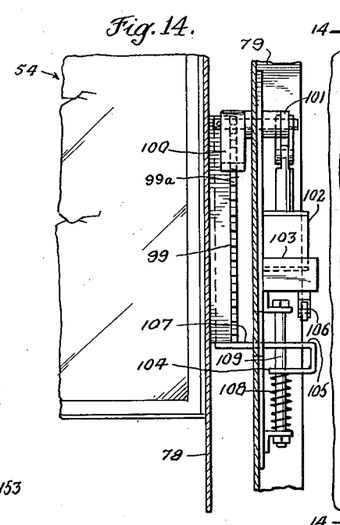
FIGURE 14 is a section view on the line 14—14 of FIGURE 13.

The electrical equipment associated with the delivery area includes the following components, all of which have been identified before. As shown in FIGURES 13 and 14, door lock solenoid 102 is mounted on the upright frame 79 in a position to operate the pawl 109 of the door lock mechanism. The access door switch 103 is also positioned on the upright frame 79. As explained above, this switch responds to the opening and closing of the access door. It is in its normally open (N.O.) position, as shown on FIGURE 20, when the access door is closed. The delivery station switch 95 is mounted below the front edge of the floor 92 of the delivery station. (See FIGURE 4.) This switch is in its normally open (N.O.) position when a carton present in the delivery station depresses the floor 92.

The electrical components associated with the article feed mechanism include the support shelf switch 140 which is mounted below the support shelf 57. It will be remembered that one rail of the shelf is pivotally mounted and spring loaded to operate switch 140. This switch is in its normally open (N.O.) position when a carton is present on the shelf 57, and moves to its closed (N.C.) position when a carton is removed from the shelf. The motor switch 135 is also mounted below the shelf 57 at the back thereof in a position to be operated by the crank of the motor 131. This switch is in its normally closed (N.C.) position when the motor is off and the motor crank is in contact with the switch lever. The switch is open (N.O.) when the motor is operating and the crank is out of contact with the switch operator. It will also be remembered that the article feed mechanism motor 131 is mounted beneath the shelf 57.

The electrical components associated with the article conveyor include the side wall switch 161. This switch is mounted on the movable side wall 62 near the bottom thereof and close to its front edge. The sensing element which operates this switch is so positioned that a carton located on the shelf 57 immediately behind the delivery station will hold this switch in its normally open (N.O.) position. In addition, the sensing element is so placed that a carton in the storage compartment directly above the front end of shelf 57 will operate in the same way to maintain switch 161 in its normally open position. If there is no carton in either of the before-mentioned positions, this switch will assume its closed (N.C.) position. Another component of the article conveyor is the governor solenoid 201. This solenoid is positioned near the top of the conveyor adjacent the governor mechanism (see FIGURES 8 and 9) and, when energized, releases the governor and thus allows the conveyor to move downwardly. When de-energized, the solenoid 201 causes the governor to stop.

The sold-out indicator apparatus comprises a sold-out lamp 215. This lamp may be positioned at any convenient point on the front of the machine.

The various components which have just been identified are interconnected with wires as indicated on FIGURE 20.

*Unified description of electrical and mechanical operation*

In this section the electrical and mechanical operation of the machine will be summarized, with special emphasis being placed on the operation of the electrical control system.

Once again, the first case to be considered is a ready-to-vend condition in which a carton is located in the delivery area, cartons are located on the shelf of the article feed mechanism, and cartons are located on the conveyor in the storage compartment. This situation is reflected in FIGURE 20 as drawn.

In the ready-to-vend condition, relay K2 is energized and, therefore, contact 213 is closed, contact 212 is open, and contact 214 is closed. The insertion of sufficient money into the coin mechanism establishes a voltage across relay K1. The plus side of this voltage originates at motor switch 135 and is supplied through the C.R.E.M. signal line and the coin mechanism and price selector mechanism to the relay. The relay thus energizes, thereby opening contact 210 which breaks the C.R.E.M. signal line. At the same time, contact 211 is closed by the relay, and by this means the positive side of the voltage across the relay K1 is shifted from that supplied at switch 135 to that supplied at contact 214.

This voltage, at the same time that it energizes and maintains in an energized condition the relay K1, also energizes the door lock solenoid 102 in the delivery area. The operation of this solenoid withdraws the pawl 100 from the path of travel of the door lock bar 99, thus unlocking the door. The customer raises the door in order to gain access to the carton in the delivery station. It should be noted that the operation of raising the door moves the access door switch 103 from its normally open position to its closed position, but inasmuch as the closed position of this switch is dead, no further electrical operation is initiated thereby. The customer, after opening the door, removes the carton from the delivery station. The delivery station switch 95 positioned beneath the floor 92 of the delivery station is moved by this operation from its normally open position to its closed position. By this means the positive voltage supply at the common of switch 95 is electrically separated from the relay K2 in the vend control. Thus the only voltage now sustaining relay K2 is that stored in the capacitor of the time delay equipment. This voltage dissipates in about two seconds and relay K2 de-energizes. This opens contact 213 and contact 214. The opening of the latter contact removes the voltage from relay K1 and it drops out. By dropping out, it closes contact 210. The opening of contact 214 caused by relay K2 de-energizing or dropping out also de-energizes the door lock solenoid 102 in the delivery area. Thus the pawl 100 associated with this solenoid moves back into line of travel with the notched bar 99 carried by the access door and will lockingly engage it when the door is almost closed.

The positive voltage source at the common terminal of switch 95, which was originally utilized to energize relay K2, is switched (by the removal of a carton from the delivery station and the consequent movement of switch 95 to its closed position) to the common terminal of access door switch 103. After the customer has removed his carton he allows the access door to close, thereby returning access door switch 103 to its normally open position. The positive voltage appearing at the common terminal of switch 103 thus passes through this switch and through the contact 212 (which, because K2 is now de-energized, is closed), to the common terminal of support shelf switch 140, in the article feed mechanism.

Switch 140 is in its normally open position because in the case under consideration there are cartons on the support shelf which maintain it in this condition. Thus voltage originating at switch 95 is passed through switch 140 to the open (N.O.) side of motor switch 135. By this means the article feed motor 131 is turned on. As it operates it pushes the carriage forward and the pusher arms on the carriage push a carton from the support shelf into the delivery station. In addition, as the motor begins to turn, the crank which was holding switch 135 in its normally closed position moves away from the switch and allows it to assume its open position. Thus for a time positive voltage is supplied to the motor both from the common terminal of switch 95 and the common terminal of motor switch 135. When the carton is pushed from the support shelf into the delivery station it depresses the floor 92 of the station, thus moving switch 95 to its normally open position. Positive voltage from the common of switch 95 now reenergizes relay K2. In addition, the positive voltage at switch 95 is electrically separated from the motor 131 by the operation of switch 95 and by the opening of contact 212, as a result of the energization of K2.

When this occurs, motor 131 does not stop operating because it is supplied with positive voltage from the common terminal of motor switch 135. Therefore, the motor continues to turn to complete one full revolution. In the last half of said revolution the motor draws the carriage toward the rear of the machine to position it to push the next carton from the shelf to the delivery station at the appropriate time. Upon completing one revolution, the crank of the motor operates switch 135 to move it from its open position to its normally closed position. This stops the motor since the positive voltage at the common terminal of switch 135 is separated from the motor. The operation of switch 135 directs this voltage through contact 213 of the vend control (which is closed because K2 is now energized) and through contact 210 of the vend control (which is closed because K1 is de-energized) to reestablish the coin return electromagnet (C.R.E.M.) signal to the coin mechanism. The coin mechanism will now accept money for the initiation of another dispensing operation.

Consider now a ready-to-vend condition in which there is a carton in the delivery area, no carton on the support shelf of the article feed mechanism, and at least one carton on the article conveyor in the storage compartment in a position to hold side wall switch 161 in its normally open (N.O.) position. (In order to meet the last condition, the carton on the conveyor must be positioned at the front end of the conveyor just above the front end of the support shelf 57. It will be more normal, however, to have a full series of cartons on the article conveyor instead of just one.) In this ready-to-vend condition the electrical components will be arranged substantially as indicated on FIGURE 20 except that support shelf switch 140 will be in its closed (N.C.) position because no carton is on the support shelf.

Upon the insertion of the proper amount of money, the same sequential steps outlined just above will occur during the first part of the operation. Thus, K1 will be energized to operate the door lock solenoid 102, which unlocks the door. The removal of a carton from the delivery station by the customer operates delivery station switch 95 to remove the positive voltage originating at the common terminal of that switch and thus start the time delayed de-energization of relay K2. When the customer allows the access door to close, the access door switch 103 is moved to its normally open position.

From this point the operation is modified in the following manner from that given just above. The positive voltage originating at switch 95 is passed through switch 103 and contact 212 which is now closed. It thus enters the common terminal of support shelf switch 140 in the article feed mechanism. Since this switch is in its closed position, because the article support shelf is empty, the voltage is passed to the common terminal of the side wall switch 161 in the article conveyor. Switch 161 is in its normally open position because a properly positioned carton on the conveyor holds it in this position. Thus the voltage is delivered to the governor solenoid 201. By this means, solenoid 201 is energized, and it depresses the trigger on the governor to allow the governor to turn and the conveyor to move downwardly under the influence of gravity.

The article conveyor moves downwardly to deposit the lower-most carton or series of cartons on the support shelf 57. This has no effect on side wall switch 161, because the sensing element of this switch is positioned to be operated by a carton at the front end of the shelf, in addition to being operated by a carton on the conveyor. However, the deposition of a carton or a series of cartons on the support shelf 57 causes support shelf switch 140 to move from its closed position to its normally open position. This removes the positive voltage from governor solenoid 201. When solenoid 201 de-energizes, the spring loaded trigger of the governor returns to its off position and a pawl is inserted into the path of dogs positioned on the governor to stop it. This also stops the conveyor, as was explained before.

The return of switch 140 to its normally open position redirects the positive voltage which was operating the governor solenoid to the open (N.O) side of motor switch 131. This causes the motor in the article feed mechanism to begin operating. From this point the operating sequence discussed above is resumed. That is to say, the motor pushes a carton into the delivery station which causes relay K2 to energize once again and the motor continues to operate for a full revolution. When it turns itself off by moving switch 135 to its normally closed position, the C.R.E.M. signal is re-established.

Consider as the last typical ready-to-vend condition one in which there is a carton in the delivery area, but both the support shelf of the article feed mechanism and the supports on the article conveyor are empty of cartons. This ready-to-vend condition is substantially reflected by FIGURE 20 with the following modifications. Switch 140 underneath the support shelf 57 is in its closed (N.C.) position because there are no cartons on the shelf. The side wall switch 161 in the storage compartment is in the closed (N.C.) position because there are no cartons on the conveyor.

The sequence of operation taking place in this situation is substantially the same at the beginning as that described for the two vending situations already considered. Briefly, the insertion of the proper amount of money causes unlocking of the access door in the delivery area. When the customer removes the carton, relay K2 is de-energized by the operation of switch 95.

At this point, the positive voltage originating at the common terminal of switch 95 is passed through this switch and through access door switch 103 when the door is closed to contact 212 in the vend control. This contact is closed because relay K2 is de-energized and the voltage is passed to the common terminal of support switch 140. Since this switch is in its closed position, the voltage is passed to the common terminal of side wall switch 161 in the storage compartment. Since this switch is in its closed position, which indicates that the storage compartment is empty, the voltage is passed to the sold-out mechanism thus lighting the sold-out lamp therein. By this means an indication is given that the machine is empty, and, in addition, no step has been taken to re-establish the C.R.E.M. signal. Therefore, the coin mechanism will not accept money. The machine will remain in this condition until it is serviced.

I claim:

1. An article dispensing machine comprising a cabinet, an article support in the cabinet establishing a normally occupied station for delivery of such articles from the machine, a door in the cabinet adjacent the delivery station and providing access to an article supported at said station, article storage means in the cabinet providing for support of a series of articles organized for successive feed to the delivery station, a barrier disposed between the delivery station and the series of articles in the storage means, the barrier being displaceable to provide for feed of an article from the stored series to the delivery station, mechanism for successively feeding articles from the stored series to the delivery station, and actuating means for the feed mechanism including two control devices, one of which comprises a sensing device responsive to the presence of an article in the delivery station to disable the actuating means and the other of which comprises a sensing device responsive to the presence of the barrier between the delivery station and the stored articles to disable the actuating means.

2. An article dispensing machine comprising a cabinet, an article support in the cabinet establishing a normally occupied station for delivery of such articles from the machine, a door in the cabinet adjacent the delivery station and providing access to an article supported at said station, article storage means in the cabinet providing for support of a series of articles organized for successive feed to the delivery station, article feeding means for feeding articles from the storage means to the delivery station, a barrier disposed between the delivery station and the series of articles in the storage means, a toothed door rack connected to the access door for movement therewith, a second toothed gear rack connected to the barrier for movement therewith, and gear mechanism mounted on the cabinet and disposed between said racks and engaged therewith, the barrier and the access door thereby being interconnected for edgewise displacement movement in directions providing for positioning of the barrier between the delivery station and the stored articles when the access door is opened and for displacement of the barrier when the access door is closed.

3. An article dispensing machine comprising a cabinet, an article support in the cabinet establishing a normally occupied station for delivery of such articles from the machine, a door in the cabinet adjacent the delivery station and providing access to an article supported at said station, article storage means in the cabinet including an article supporting shelf one end of which is adjacent the delivery station and which shelf is extended away from the delivery station to provide for support of a series of articles organized for successive feed to the delivery station, mechanism for successively feeding articles from the series supported by the shelf to the delivery station, the article storage means further including a support mechanism carrying an additional series of articles above the first series said support mechanism comprising a narrow support shelf to one side of said article supporting shelf and a vertical wall spaced horizontally from the narrow support shelf at the other side of said article support shelf and conveyor mechanism carrying said narrow support shelf and being downwardly movable to deposit said additional series of articles on said article supporting shelf when the last article of said first series has been fed to the delivery station.

4. An article dispensing machine comprising a cabinet, an article support in the cabinet establishing a normally occupied station for delivery of such articles from the machine, a door in the cabinet adjacent the delivery station and providing access to an article supported at said station, article storage means in the cabinet including an article supporting shelf positioned at the same level as said article support one end of which shelf is adjacent the delivery station and which shelf is extended away from the delivery station to provide for support of a series of articles organized for successive horizontal feed to the delivery station, mechanism for successively feeding articles from the series supported by the shelf to the delivery station, and an endless conveyor located toward one side of said shelf and having a conveyor run arranged to move downwardly past said shelf, the conveyor having a plurality of supports carried thereby for storing a plurality of series of articles for sequentially depositing onto said shelf.

5. A machine for alternatively dispensing cartons of beverage containers of at least three sizes comprising a cabinet having a dispensing opening, carton storage means in the cabinet providing for storage of a plurality of series of cartons for sequential dispensing through the dispensing opening, and an endless conveyor providing for storage of the several series of cartons in superimposed relationship and for stepwise advancement of the several series downwardly for sequential dispensing through the dispensing opening, the conveyor having a plurality of mountings spaced therealong for carrying detachable carton series supports alternatively in sets of different but uniform spacings, the mountings having three different spacings, the conveyor being of a length equal to a common multiple of said three different spacings, and the extent of and the sequence of the spacings of different extents being in a uniform pattern within each length of the conveyor comprising a lowest common multiple of said three different spacings, so that the detachable supports may be alternately carried in sets of different but uniform spacings to alternatively accommodate cartons of three different sizes of beverage containers.

6. In a dispensing machine for successively dispensing articles, an article storage compartment, a generally upright article conveyor within said compartment, said conveyor comprising a pair of rotatable sprockets having mounting means positioning said sprockets a spaced distance apart, a pair of endless conveyor chains, one mounted on each of said sprockets, forming an upward run and a downward run, generally upright abutment means positioned adjacent and behind said downward runs, the abutment means extending from a point a spaced distance below and inboard of said sprockets to a point above the bottom of said downward run, an article supporting member pivotally mounted on said chains and extending therebetween, said article supporting member comprising an article carrying ledge engageable with the sprocket mounting means when the article support member is at the top of the upward run, a tab for sliding engagement with the abutment means when the article supporting member is positioned on a downward run, and a trip member positioned to catch on the top edge of said abutment means as the article support member passes in upside down position around said sprocket mounting means, to thereby apply an overturning moment to said article support member and thus right it at the top of said downward run.

7. In a dispensing machine for successively dispensing articles, an article storage compartment, an endless article conveyor within said compartment and having a generally upright run in which the conveyor travels downwardly, supporting means for the conveyor adjacent the upper end of said upright run, abutment means extending along the upright run of the conveyor with its upper end terminating short of the supporting means for the conveyor at the upper end of said run, and an article supporting device mounted on the conveyor for pivotal movement between an article-supporting position and a non-supporting position, and having a part engageable with said abutment means as the conveyor travels downwardly in said run and serving to retain the device in article-supporting position, said device further having a part engageable with said conveyor supporting means to rotate the article supporting device from said nonsupporting position toward the article-supporting position as the device returns with the conveyor to the upper end of said upright run and having a trip member positioned to catch on the top edge of said abutment means as the article support member is rotated by said conveyor supporting means, to thereby apply an overturning moment to said article support member and thus right it at the top of said run.

8. An article dispensing machine comprising a cabinet, an article support in the cabinet establishing a normally occupied station for delivery of such articles from the machine, a door in the cabinet adjacent the delivery station and providing access to an article supported at said station, article storage means including an article supporting shelf in the cabinet for a series of articles arranged in a row thereon extending away from the delivery station for successive feed to the delivery station, a barrier disposed between the delivery station and the series of articles in the storage means, the barrier being displaceable to provide for feed of an article from the stored series to the delivery station, reciprocating feed mechanism comprising a series of spaced pusher fingers successively engageable with the end of said row away from the delivery station for pushing the article of said row nearest the delivery station to said delivery station, and actuating means for the feed mechanism including two control devices, one of which comprises a sensing device responsive to the presence of an article in the delivery station to disable the actuating means and the other of which comprises a sensing device responsive to the presence of the barrier between the delivery station and the stored articles to disable the actuating means.

9. An article dispensing machine comprising a cabinet, an article support in the cabinet establishing a station for delivery of such articles from the machine, a door in the cabinet adjacent the delivery station and providing access to an article supported at said station, article storage means in the cabinet providing for support of a series of articles organized for successive feed to the delivery station, article feeding means for feeding articles from the storage means to the delivery station, a barrier disposed between the delivery station and the series of articles in the storage means, said door being generally box shaped and having a front wall, side walls and a top wall, one of said side walls carrying a toothed gear rack, said barrier carrying a toothed gear rack facing said first mentioned gear rack, and gear mechanism engaging said racks, the barrier and the access door thereby being interconnected for displacement movement in directions providing for positionng of the barrier between the delivery station and the stored articles when the access door is opened and for displacement of the barrier when the access door is closed.

10. An article dispensing machine comprising a cabinet, an article support in the cabinet establishing a normally occupied station for delivery of such articles from the machine, article storage means in the cabinet including an article supporting shelf one end of which is adjacent the delivery station and which shelf is extended away from the delivery station to provide for support of a series of articles organized for successive feed to the delivery station, feed mechanism for successively feeding articles from the series supported by the shelf to the delivery station, the article storage means further including a support carrying an additional series of articles above the first series, conveyor mechanism carrying said latter support and being downwardly movable to deposit said additional series of articles on said shelf when the last article of said first series has been fed to the delivery station, and an electrical control system including, in combination with a voltage source, a first sensing device associated with the delivery station and with said voltage source and providing for delivery of said voltage to the feed mechanism in the absence of an article in the delivery station, and thereby initiate operation of the feed mechanism, and a second sensing device associated with the feed mechanism and with said voltage source through said first sensing device and providing for delivery of said voltage to the conveyor mechanism in the absence of an article on said shelf and thereby initiate operation of the conveyor mechanism.

11. An article dispensing machine comprising a cabinet, an article support in the cabinet establishing a normally occupied station for delivery of such articles from the machine, article storage means in the cabinet including an article supporting shelf one end of which is adjacent the delivery station and which shelf is extended away from the delivery station to provide for support of a series of articles organized for successive feed to the delivery station, feed mechanism for successively feeding articles from the series supported by the shelf to the delivery station, the article storage means further including a support carrying an additional series of articles above the first series, conveyor mechanism carrying said latter support and being downwardly movable to deposit said additional series of articles on said shelf when the last article of said first series has been fed to the delivery station, an electrical control system including, in combination with a voltage source, a first sensing device associated with the delivery station and with said voltage source and providing for delivery of said voltage to the feed mechanism in the absence of an article in the delivery station, and thereby initiate operation of the feed mechanism, and a second sensing device associated with the feed mechanism and with said voltage source through said first sensing device and providing for delivery of said voltage to the conveyor mechanism in the absence of an article on said shelf and thereby initiate operation of the conveyor mechanism, a sold out indicating device, and a third sensing device associated with the conveyor mechanism, with the feed mechanism, and with said voltage source through the second and first sensing devices and providing for delivery of said voltage to the sold out device in the absence of an article on the conveyor and on said shelf, and thereby initiate operation of the sold out device.

12. An article dispensing machine comprising a cabinet, an article support in the cabinet establishing a normally occupied station for delivery of such articles from the machine, article storage means in the cabinet including an article supporting shelf one end of which is adjacent the delivery station and which shelf is extended away from the delivery station to provide for support of a series of articles organized for successive feed to the delivery station, feed mechanism for successively feeding articles from the series supported by the shelf to the delivery station, the article storage means further including a support carrying an additional series of articles above the first series, conveyor mechanism carrying said latter support and being downwardly movable to deposit said additional series of articles on said shelf when the last article of said first series has been fed to the delivery station, and electrical control system including, in combination with a voltage source, a first sensing device associated with the delivery station and with said voltage source and providing for delivery of said voltage to the feed mechanism in the absence of an article in the delivery station, and thereby initiate operation of the feed mechanism, and a second sensing device associated with the feed mechanism and with said voltage source through said first sensing device and providing for delivery of said voltage to the conveyor mechanism in the absence of an article on said shelf and thereby initiate operation of the conveyor mechanism, an access door in the cabinet adjacent the delivery station, and a switch in the circuit between the second sensing device and the voltage source, said switch being associated with the access door and operated thereby to disable said circuit when the door is open.

References Cited by the Examiner

UNITED STATES PATENTS

| | | | |
|---|---|---|---|
| 1,564,540 | 12/25 | Dinwiddie | 221—109 |
| 1,824,441 | 9/31 | Miller | 221—15 |
| 2,304,484 | 12/42 | Smith | 221—298 |
| 2,389,283 | 11/45 | Stewart | 312—97 |
| 2,888,165 | 5/59 | Bookout et al. | 221—150 |
| 2,925,194 | 2/60 | Mihalek | 221—253 |
| 2,957,603 | 10/60 | Dubois | 221—11 |

RAPHAEL M. LUPO, *Primary Examiner.*

LOUIS J. DEMBO, *Examiner.*